Jan. 31, 1933.   J. F. BURNS   1,895,606
DEVICE FOR COMPUTING SPHERICAL TRIANGLES
Filed Nov. 9, 1929   4 Sheets-Sheet 1

INVENTOR
By JOSEPH F. BURNS

ATTORNEY

Jan. 31, 1933.  J. F. BURNS  1,895,606

DEVICE FOR COMPUTING SPHERICAL TRIANGLES

Filed Nov. 9, 1929   4 Sheets-Sheet 2

INVENTOR
By JOSEPH F. BURNS

ATTORNEY

Jan. 31, 1933.   J. F. BURNS   1,895,606
DEVICE FOR COMPUTING SPHERICAL TRIANGLES
Filed Nov. 9, 1929   4 Sheets-Sheet 3
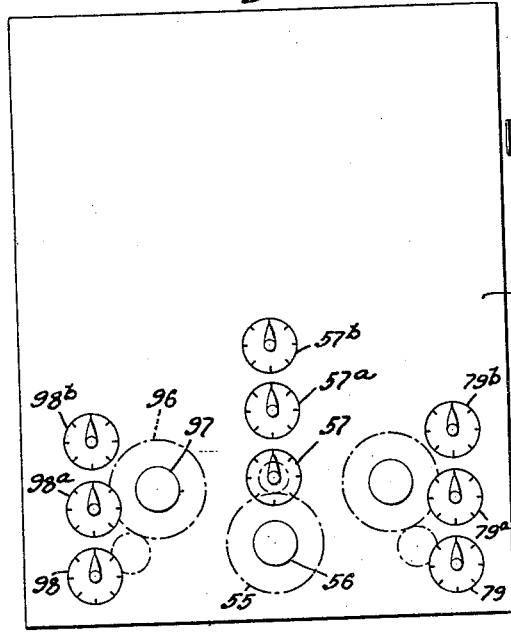
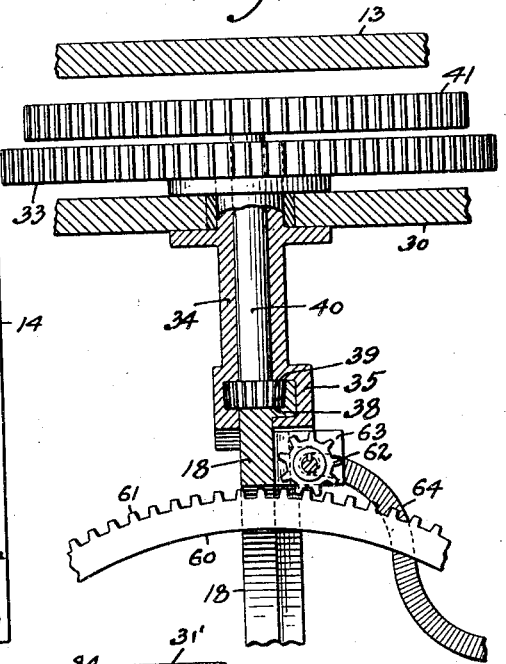
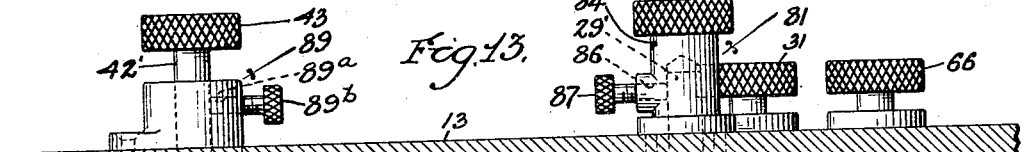

Jan. 31, 1933. J. F. BURNS 1,895,606
DEVICE FOR COMPUTING SPHERICAL TRIANGLES
Filed Nov. 9, 1929 4 Sheets-Sheet 4
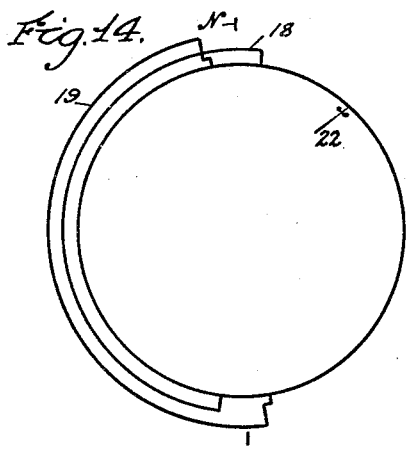
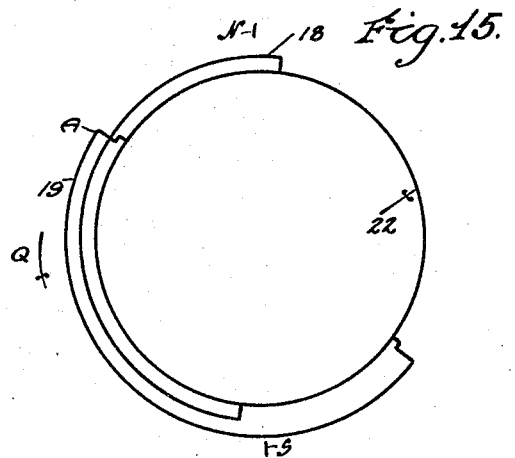
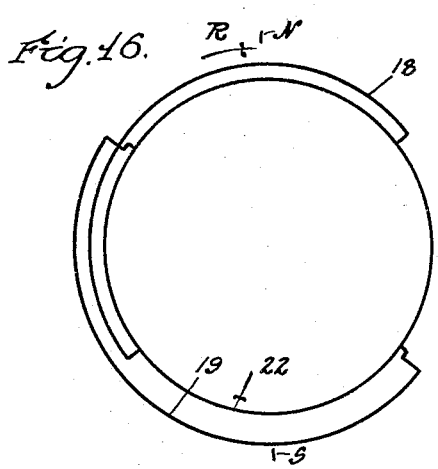
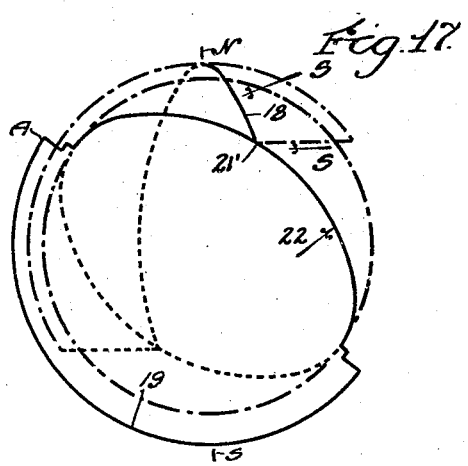
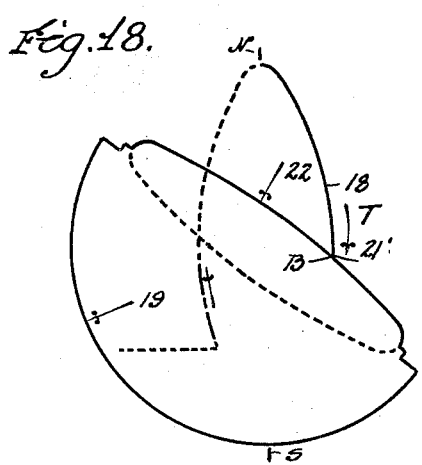
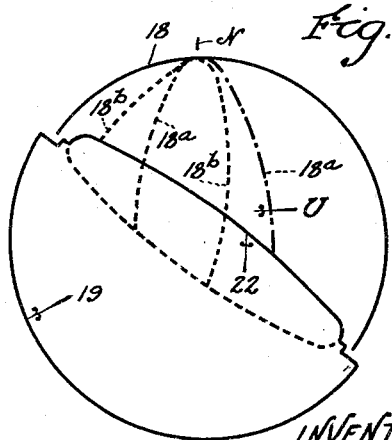
INVENTOR
By JOSEPH F. BURNS
ATTORNEY Patented Jan. 31, 1933

1,895,606

UNITED STATES PATENT OFFICE

JOSEPH F. BURNS, OF LOS ANGELES, CALIFORNIA

DEVICE FOR COMPUTING SPHERICAL TRIANGLES

Application filed November 9, 1929. Serial No. 405,991.

This invention relates broadly to the art of navigation and has to do with instruments for mechanically computing the parts or elements of spherical triangles. It is, of course, well known that the shortest distance between two points on the earth's surface lies along a great circle passing through the two points in question, and in plotting a course from a point of departure to a point of arrival on the earth's surface, it is the usual practice to determine the bearings of numerous predetermined points along such a circle, such points being separated by units of distance such as 50 or 100 miles. These bearing values are obtained by solving the spherical triangles bounded by the meridians containing the point of arrival and the other point on the course, and the great circle segment between these two points. A chart is usually prepared from the bearings calculated in this manner, from which the navigator can, by taking his course at these spaced intervals during his voyage determine whether or not he is following the great circle course between the two points. These values are ordinarily calculated and the chart is prepared before the vessel starts on its voyage. The calculation of a number of such values for a course of great length requires the service of a skilled mathematician and also consumes considerable time. With the advent of aerial navigation, there has come a demand for some means of rapidly making such computations of spherical triangles and it is the main object of this invention to produce a device by means of which the parts or elements of a spherical triangle may be rapidly and accurately computed when certain of the elements are known.

The device contemplated by this invention embodies mechanical means for solving spherical triangles and is so constructed as to be adapted for use in determining the great circle distance between two points on the earth's surface when the latitude and the longitude of the two mentioned points are known. The device also comprises means for determining the bearing of each point from the other, and may be used to determine the bearing, the longitude and the latitude of any intermediate point lying on the great circle course between the two given points.

The general theory underlying the device contemplated by this invention is, as inferred above, based upon the mechanical construction of a spherical triangle which is identical with the spherical triangle on the earth's surface that is defined by the great circle segment between the two points in question and the two meridians passing through these points. One of the points, which is a point of arrival, is adapted to remain fixed in position, and the other point, which is the point of departure, is arranged so that it may be moved along the great circle to the point of arrival. The spherical triangle mentioned above is formed by a series of arcs and a great circle ring, each of which is associated with indicating means adapted to register its movement. The great circle ring is adapted to be suspended from two sets of diametrically opposed pivots which are movable with respect to each other, and are mounted in the ends of two arc members. These arc members are carried by arc supports which may be described as being mounted in a frame at the opposite extremities of a vertical axis. Each of the arc members is adapted to swing rotatably through its support and one of the members is held in a fixed plane while the support for the other member is so constructed as to permit its rotation about the vertical axis.

The great circle ring may, therefore, be swung into any position within the frame so that it can be made to assume a position identical with that of the great circle which contains the two points in question.

It is an object of this invention to produce a device of the class described which is of simple form and construction and may be economically manufactured and easily operated by any one who is familiar with the elements of navigation. The details in the construction of the preferred form of my invention together with other objects attending its production will be understood from the following description of the accompanying drawings which are chosen for illustrative purposes only and in which Fig. 1 is a diagram of a sphere representing the earth which will be used in describing the theory of the operation of my invention;

Fig. 8 is an outside elevation showing the construction of the front panel, which is partially broken away in Fig. 6.

Fig. 9 is a partial sectional elevation illustrating details in the construction of one of the meridian arc supports, and may be considered as having been taken in the plane represented by the line 9—9 in Fig. 6;

Fig. 10 is an enlarged partial elevation showing details in the construction of the other meridian arc support and may be considered as having been taken substantially in a plane represented by the line 10—10 in Fig. 7;

Fig. 11 is an enlarged partial sectional elevation which may be considered as having been taken in the plane represented by the line 11—11 of Fig. 10;

Fig. 12 is an enlarged partial section showing that part of the great circle ring and associated parts indicated by the arrow 7 in Fig. 6.

Fig. 13 is an enlarged partial view showing preferred forms of clutch and lock mechanism which may be used in controlling the operation of the indicator control gears used in this form of my invention;

Figs. 14 to 19 inclusive are diagrammatic views showing various steps in the operation of my invention.

Figure 1:
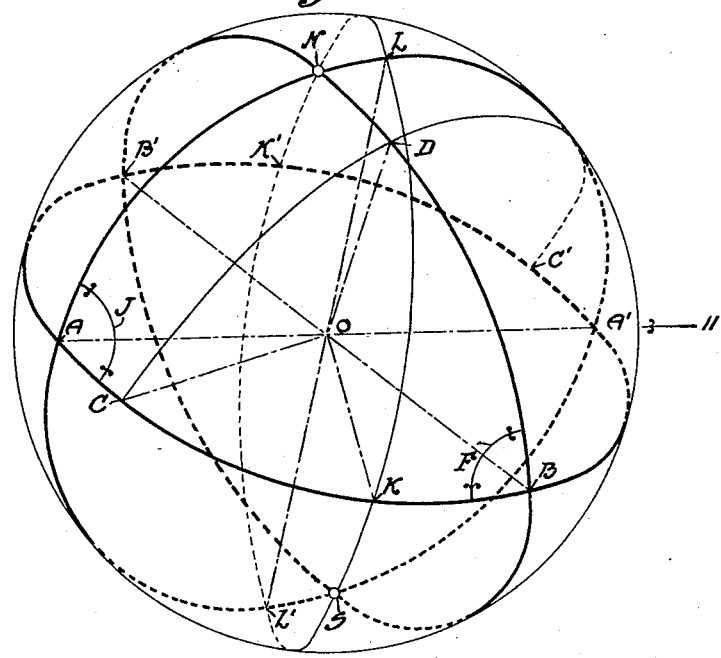

Referring now to the drawings, Fig. 1 shows a sphere 11 representing the earth with the north pole inclined toward the observer. Let it be assumed that the point B represents a point of departure which lies along the meridian NBS, and the point A is a point of arrival which lies along the meridian NAS. The latitude at B may then be measured by the arc NB and the latitude of A may be measured by the arc NA or its corresponding arc SA'. The great circle course between the points B and A is represented by the arc BKCA which is a segment of the great circle BKCAB'K'C'A'. The length of the arc BA is, therefore, a measure of the great circle distance from B to A. It will be apparent that if the great circle BKCAB'K'C'A' is made in the form of a ring which is supported by pivot points situated at B—B' and A—A' respectively, and if the meridians ASA' and BNB' are made in the form of arcs which are pivotally attached to the ring at the pivot points A, A' and B, B' respectively, the arcs corresponding to the meridians being movable, the great circle ring may be swung to assume any position within the circumference of the sphere 11. It will also be apparent that if the meridian arc B'NB is arranged so as to swing about a vertical axis passing through the north pole, that various points similar to the point of departure B may be located along the great circle segment BKCA and that for each point so located the longitude and the great circle distance may be determined through indicating means associated with the arc B'NB and the great circle ring, respectively. In order that this movement may be effected, it is necessary, therefore, to make the device contemplated by this invention so that the pivot points A, A' and B, B' are movable relative to each other upon the great circle ring.

The bearing of the point A from point B is measured by the angle F which is equivalent to the arc CD formed by the intersection of a plane COC'D with the surface of the sphere. In order that the arc CD may always be effective to measure an angle equivalent to F, it is necessary that the plane of this arc be normal to the plane of the great circle and also normal to the plane containing the meridian NDB. Since the bearing of point A from point B is always changing as B approaches A, it is necessary for the purpose of registering this bearing upon an arc equivalent to arc CDC' that the equivalent arc be movable in fixed relation to the point B, the great circle, and the plane of the meridian NDB. The bearing of the point B from A is measured by the angle J or its equivalent arc LDK. The value of the arc LDK is of course equal to the arc L'K' so that the bearing of B from A may be measured upon an arc KL'K' which is normal to the great circle and is also normal to the plane of the meridian NA. Since the point of arrival A is always fixed, the bearing of B from A will remain constant and the arc equivalent to arc KL'K' must, therefore, bear a fixed relation to the point A, the great circle, and the arc ANA'.

The device contemplated by this invention consists in a general way of a ring corresponding to the great circle, meridian arcs corresponding to arcs ANA' and BNB' and bearing arcs corresponding to arcs CDC' and KLK'. The great circle ring in the preferred form of my invention is composed of two rings in rotative sliding engagement with each other, and the arc corresponding to the meridian arc ANA', or its supplement arc ASA', is pivotally attached to one of these rings while the other meridian arc is pivotally attached to the other ring. The two concentric rings are provided with indicating means adapted to register therebetween their movement relative to each other and consequently the great circle distance between two predetermined points on the ring, and the two meridian arcs are provided with indicating means adapted to register the latitude of the points A and B, respectively.

Figure 2:
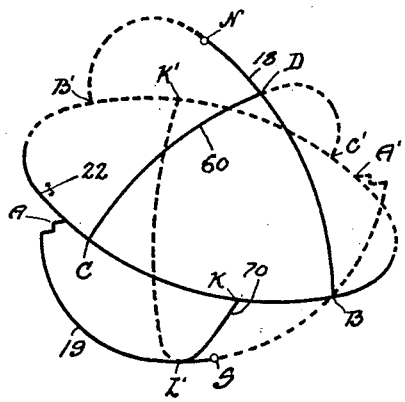
Fig. 2 is a diagrammatic view showing the elements embodied in the preferred form of my invention as being set to correspond to the elements of the spherical triangle shown in Fig. 1.
Figure 3:
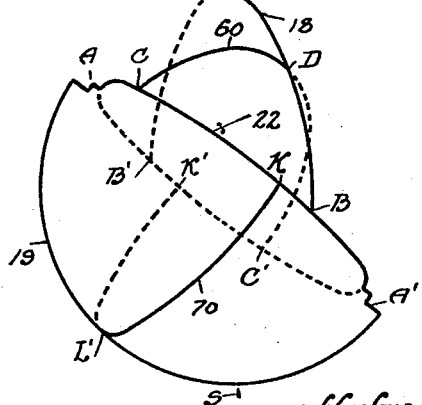
Fig. 3 is a diagrammatic view similar to Fig. 2 but showing the instrument as having been rotated so that one of the meridian arcs lies in the plane of the paper.
Figure 4:
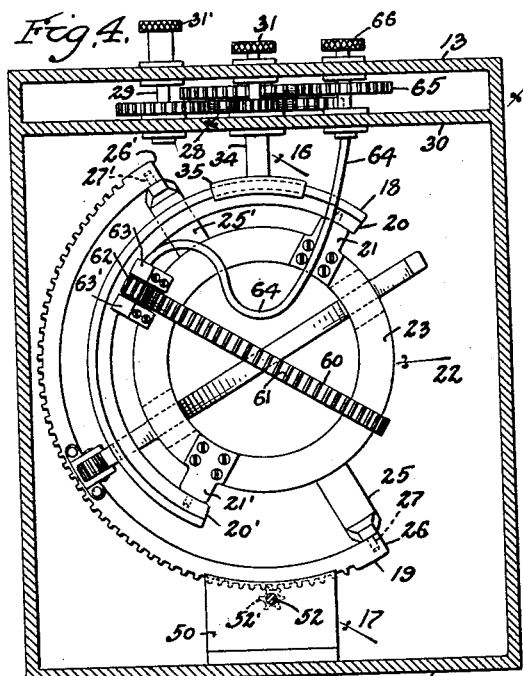
Fig. 4 is a sectional elevational view showing the details of construction of the preferred form of my invention and illustrating the elements as being arranged in a neutral position.

Fig. 2 is a diagrammatic view showing the manner in which the elements of the device contemplated by my invention may be arranged to indicate the great circle course AB shown in Fig. 1, and Fig. 3 is similar to Fig. 2 but shows the parts having been moved so that the element which represents the arc ASA' lies in the plane of the paper.

The parts shown in Figs. 2 and 3 will be further identified and their operation more clearly explained following the description of Figs. 4 to 11 inclusive which show the details in the construction of a preferred form of my invention.

Referring now to Figs. 4 to 8 inclusive, reference numeral 12 indicates a frame or casing having a top 13, a front side 14, and a bottom 15. Arc supporting members generally indicated by reference numerals 16 and 17 are shown as being mounted in coaxial relation with each other upon the top and bottom members respectively. The arc supporting member 17 is shown as being in a fixed plane forming a fixed position of reference, and the arc supporting member 16 is shown as being formed so as to be rotatable about a vertical axis. The arc supporting member 16 carries a meridian arc 18 which, as will be hereinafter more fully explained, is used in locating the point of departure. The arc supporting member 17 carries a meridian arc 19 which is used in locating the point of arrival. The two ends 20 and 20' of the meridian arc 18 are provided with pivot members 21 and 21' which engage the periphery of a great circle ring member 22. The great circle ring member is composed of two rings 23 and 24, (see Figs. 6 and 12), which are in rotative sliding engagement with each other, and it will be noted from Fig. 6 that the pivot members 21 and 21' are attached only to the ring member 23. The ring member 24 is supported at two diametrically opposite points by pivot members 25 and 25' which are attached to the two outer ends 26 and 26' of the meridian arc 19 as indicated at 27 and 27'. The meridian arcs 18 and 19 are rotatable in their respective supports 16 and 17, and it will be seen from this construction that by rotating the arc 18 about a vertical axis, and rotating both of the arcs 18 and 19 through their respective supporting members, the great circle ring member 22 may be made to assume any position on the circumference of an imaginary sphere which corresponds to the sphere shown in Fig. 1.

In order that the movements referred to above may be registered and observed by the operator of this device, it is necessary to provide indicating means for registering the rotation of the arc 18 about a vertical axis, the rotation of the arcs 18 and 19 with respect to their respective supporting members and also the relative rotative movement between the two rings 23 and 24. In the form shown, these movements are registered through the medium of shafts and gears which are associated with suitable indicators formed upon the sides of the casing, but it is to be understood that other means such as electrically controlled indicators might be employed for the registration of the movements of the various elements.

Figure 5:
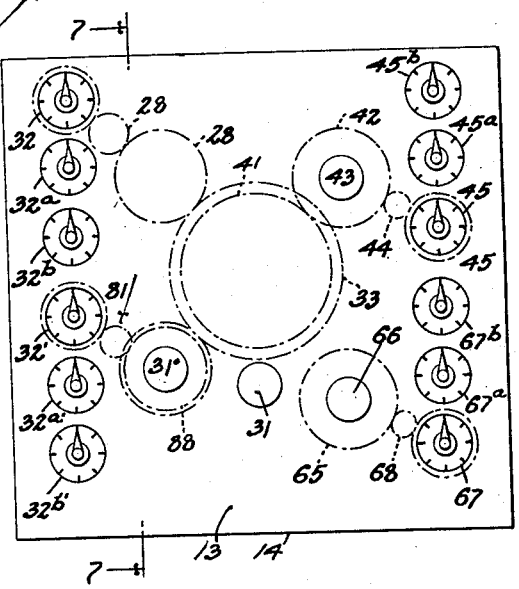
Fig. 5 is a plan view of the case or frame containing my invention and illustrates the arrangement of a part of the indicators.
Figure 6:
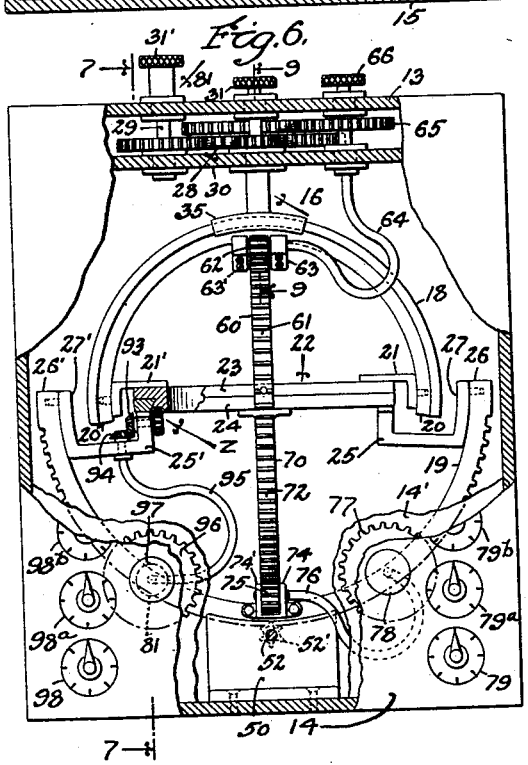
Fig. 6 is an elevational view similar to Fig. 4 but shows the elements as having been rotated into an intermediate position for the purpose of more clearly illustrating their construction.

The indicating means which are employed to register the rotative movement of the arc 18 about a vertical axis, which I will hereinafter refer to as longitude indicating means, are shown as comprising a train of gears 28 (Figs. 4 and 5) mounted upon suitable shafts 29 and 29' supported between a diaphragm plate or partition 30 and the top 13 of the box or frame. The gears 28 are associated with a knob or control button 31 and a series of indicating dials 32, 32a and 32b (Fig. 5). The gear or train of gears 28 engages a major gear 33, which is keyed to a sleeve 34, the lower end of which is provided with a stirrup member 35 that supports the arc 18.

The arc 18, as is most clearly shown in Fig. 9, is provided with a peripheral gear 38 which engages a pinion 39 formed or mounted upon the lower end of a shaft 40 which extends downwardly through the sleeve 34 and has provided at its upper end a gear 41 which is in mesh with a control gear 42 connected through a shaft 42' with an operating knob or button 43 (Fig. 13). The control gear 42 is in turn associated through the medium of gears 44 with a series of indicating dials generally indicated by reference numeral 45, 45a and 45b (Fig. 5). The indicating dials 45, 45a, and 45b register the rotative movement of the arc 18 through its supporting member 16 and will be hereinafter referred to as a latitude indicator, this unit being used for establishing the latitude of the point of departure.

The bottom or fixed meridian arc support 17 is shown as comprising two oppositely disposed plate members 50 having inwardly extending lips 51 (Fig. 11), adapted to engage flanges 50' formed on the periphery of arc member 19. The plates 50 receive at their upper ends a shaft 52 which carries a pinion 52' adapted to mesh with a peripheral gear 53 formed upon the outer edge of the meridian arc 19. The shaft 52 has provided at its outer end a control gear 55, situated between a partition 14' and the side 14 of the frame or casing 12. The control gear 55 is operated by means of a knob or button 56, and is associated with indicating dials generally indicated at 57, 57a and 57b, (Fig. 8). This control mechanism last described is used to control and register the movement of the fixed meridian arc 19 and registers the latitude of the point of arrival.

The mechanism for measuring the relative movement between the two great circle rings 23 and 24 comprises a miter gear 90 (Fig. 12) formed on the ring 23 and a pinion 91 supported by ring 24 in any suitable manner. In the form shown the pinion 91 is keyed to the inner end of a shaft 92 which is rotatably mounted in the bracket 25'. The outer end of the shaft 92 is provided with a pinion 93 which engages a gear 94. The gear 94 is mounted on the inner end of a flexible shaft 95, the outer end of which carries a control gear 96 (Fig. 6) and is provided with an operating knob or button 97. The control gear 96 operates indicator dials 98, 98a and 98b which register the great circle distance between the points in question.

Figure 7:
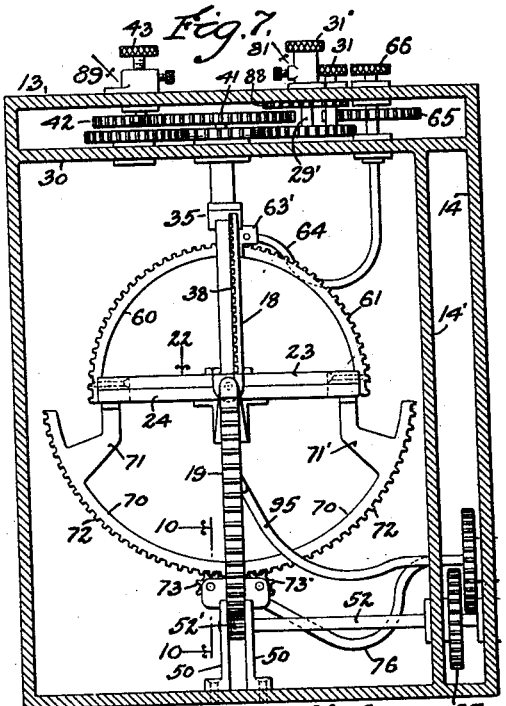
Fig. 7 is an elevational view which may be considered as having been taken substantially in a plane represented by the line 7—7 in Fig. 5 and Fig. 6.

For the purpose of determining the bearing of the point of arrival from the point of departure, I provide a bearing arc member 60 which is mounted upon the ring member 23 as shown in Fig. 7. This bearing arc member 60 is supported in a plane of the great circle ring 22 and since it is rigidly mounted upon the ring 23 it bears a fixed relation to the position of the pivot points 21 and 21' which connect the ring member 23 with the meridian arc 18. The periphery of the arc member 60 is provided with gear teeth 61 adapted to engage a pinion 62 mounted between brackets 63 and 63' which are supported by the meridian arc 18. This pinion 62 is connected through a flexible shaft 64 with a control gear 65, the movement of which is governed by a control button or knob 66. The gear 65 is associated with bearing indicating means generally indicated by reference numerals 67, 67a and 67b. The indicating means 67, 67a and 67b are operated from gear 65 through the medium of an intermediate gear or gears generally indicated at 68.

The bearing of the point of departure from the point of arrival is measured by means of a bearing arc 70 (Fig. 7), the outer ends of which are provided with arms 71 and 71' which are attached to the lower ring member 24 as shown in Fig. 7. The bearing arc 70 is provided with peripheral gear teeth 72 which engage two oppositely disposed pinions 73 and 73' mounted between bearing plates 74 and 74' and adapted to rotate or to be rotated by means of a central pinion 75 (Fig. 11). This construction permits the movement of the bearing arc 70 beyond a central position, at which such movement would stop if this arc were controlled by a single pinion. The movement of the central pinion 75 is derived from or imparted to a flexible shaft 76, the outer end of which is associated with a control gear 77 (Fig. 6) equipped with a knob or button 78 and adapted to operate indicating dials generally indicated at 79, 79a and 79b.

It is necessary from time to time in the operation of this instrument, to lock one of the members against movement or to permit one of the members to move without consequent movement of the indicating means. For example, at one point in the operation of the device where the point of departure has been established, the latitude control is locked against movement while the device is being set for longitude, and in order that the difference in longitude may be registered after the point of departure has been located, it is important to provide additional indicating means which are equipped with a clutch mechanism so that this indicating means can be introduced into operative engagement with the longitude control after the point of departure has been located. This last mentioned set of indicators is generally indicated in Fig. 5 by reference characters 32', 32a' and 32b', and is shown as being associated with a gear 28' which engages the major gear 33 of the longitude control system. The gear 28' is shown as being equipped with a clutch mechanism generally indicated in Figs. 7 and 13 by reference numeral 81, and shown in detail in Fig. 13. This clutch mechanism is illustrated as comprising a shaft 29' which is keyed to gear 28' and is rotatable within a sleeve 84, the upper end of which is provided with a control knob 31'. The sleeve 84 is shown as being provided with a transverse passage 86, which is threaded to receive a set-screw 87. The indicating means is operated by a gear 88 mounted upon the sleeve 84. When it is desired to operate the indicator the set-screw 87 is tightened, which brings the gear 88 and the driven gear 28' into fixed relation with each other.

Fig. 13 also shows a form of lock which may be used to hold the members in one of the indicating means against operation. This lock generally indicated at 89 is shown as being associated with the latitude arc support and control mechanism 16 and comprises a sleeve 89' rigidly mounted upon the casing and provided with a threaded passage 89a adapted to receive a set-screw 89b which may be used to lock the shaft 42' carrying the control knob 43 against movement at any time during the operation of the instrument.

The operation of the device contemplated by this invention will be best understood from a description of Figs. 14 to 19, inclusive, which show the movement of the major elements comprising the invention during the various steps in the process of locating two points on the earth's surface and determining the great circle distance therebetween.

As was previously pointed out, the only data necessary in using this machine is the latitude and longitude of the two points in question, for example, points A and B, as shown in Fig. 1. In the preferred manner of operating this instrument, the first step is to compute the difference in longitude between points A and B. The elements are then arranged in the position shown in Fig. 4 or as diagrammatically shown in Fig. 14. After arranging the elements in this manner, the meridian arc 19 is rotated in the direction of the arrow Q (Fig. 15) by means of the control button 56 until the indicators 57, 57a and 57b register the latitude of the point of arrival A. The elements at this time have assumed the position shown in Fig. 15. The meridian arc 18 is then rotated in the direction of the arrow R (Fig. 16) by means of the control member 43 until the indicators 45, 45a and 45b register the same latitude as is registered on indicators 57, 57a and 57b. This permits the free swinging movement of the great circle ring 22 in the next operation. The arcs 18 and 19 are then locked in these two positions with respect to the arc supporting members and the arc 18 is then turned in the direction of the arrow S, in Fig. 17, by means of the vertical control 31 until the indicators 32, 32a and 32b read the supplement of the difference in longitude between points A and B. It will be seen that this operation locates the relative position of the two meridians which contain the two points in question, the arc 19 corresponding to the meridian ASA' and the arc 18 corresponding to the meridian BNB'. The only movement necessary then to complete the location of points A and B is to swing the arc 18 in its plane until the pivot point 21' has reached the parallel of latitude corresponding to the location of the point of departure B. This movement is indicated in Fig. 18 where the arc 18 is shown as having been rotated in its supporting member in the direction of arrow T until the indicators 45, 45a and 45b register the latitude of point B. After the elements have been placed in this position, the longitude indicators 32', 32a', 32b' are introduced into the system through the medium of a clutch 81 and the great circle distance indicators 97, 97a and 97b are also introduced into the system through the medium of a similar clutch 81'.

The arc 18 is then swung in the direction of the arrow U until it lies in the plane of the arc 19, and during such movement this arc may be stopped at various predetermined intervals (18a and 18b), registered on the indicators 97, 97a and 97b, and the readings of latitude and bearing may be taken for these points from indicators 45, 45a and 45b and 67, 67a and 67b. Fig. 3 shows the position of the bearing arcs 60 and 70 in connection with the units shown in Fig. 19, and Fig. 2 shows more clearly how these arc members correspond to the arcs CDC' and KLK' respectively, shown in Fig. 1.

From the foregoing description, it will be seen that the device contemplated by this invention comprises an instrument by means of which the solution of problems in spherical geometry may be readily and accurately obtained, and which, therefore, is particularly adapted to use in navigation.

The instrument is simple in its operation and compact in structure, so that it is especially useful in aerial navigation. It is to be understood, of course, that the particular problem used in describing the operation of the invention is simply one of several methods of using the instrument, and that if the instrument is carried by a ship or an airplane, it is possible, knowing the bearing of the vessel, to determine the great circle distance and plot the course from the point at which the ship is located to any predetermined "point of arrival".

The accompanying drawings are largely diagrammatic, being chosen solely for the purpose of illustrating the invention, and while shafts and gears are shown as the means for transmitting motion to and from the various elements, it is to be understood that various modifications of the power transmission system may be devised by those skilled in the art.

The indicators shown are decimal dial indicators, one dial registering units, the other two dials registering tenths and hundredths. The arc and angle indicators may be calibrated to read degrees, minutes and seconds. There are, of course, other indicators which will lend themselves readily to use in connection with this instrument.

It is to be understood, therefore, that while I have herein described and illustrated one preferred form of the invention, and have chosen one method of operation in describing same, the invention is not limited to the precise construction or mode of operation described above, but includes within its scope such changes as may fairly come within the spirit of the appended claims.

I claim as my invention:

1. A device for measuring elements in spherical triangles embodying: a frame; oppositely disposed arc supporting members mounted in said frame; arcs rotatably mounted in said arc supporting members respectively; a great circle ring member; pivots mounted on said ring member and supported by said arcs, respectively, said pivots being adapted for relative movement about said ring member.

2. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, said pivots being adapted for relative movement about said ring member; and one of said arc supporting members being rotatable.

3. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, said pivots being adapted for relative movement about said ring member; and one of said arc supporting members being fixed, the other being rotatable.

4. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, said pivots being adapted for relative movement about said ring member; means for moving said pivot points relatively to each other.

5. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, said pivots being adapted for relative movement about said ring member; and bearing arcs for indicating the swinging movement of said great circle ring.

6. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, one of said arc supporting members being rotatable and the arc supported thereby being rotated therewith, said pivots being adapted for relative movement about said ring members; and means for moving said pivot points relative to each other.

7. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, said pivots being adapted for relative movement about said ring members; means for rotating one of said arc-supporting members to swing said great circle on said arc-supported pivot points.

8. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, said pivots being adapted for relative movement about said ring member; means for rotating one of said arc-supporting members; and means for moving said arcs in said arc-supporting members.

9. A device for measuring elements in spherical triangles embodying: a frame; oppositely disposed arc supporting members mounted in said frame; arcs rotatably mounted in said arc supporting members, respectively; a great circle ring member; pivots mounted on said ring member and supported by said arcs, respectively, said pivots being adapted for relative movement about said ring member; means for rotating one of said arc supporting members; and means mounted on said frame for holding the other of said arc-supporting members against rotation.

10. A device for measuring elements in a spherical triangle embodying: a frame; oppositely disposed arc supporting members mounted in said frame; arcs rotatably mounted in said arc supporting members, respectively; a great circle ring member comprising two coplanar concentric rings rotatable with respect to each other in their common plane; a set of diametrically disposed pivots mounted on each of said concentric rings, one of said sets of pivots being supported by one of said arcs, the other set being supported by the other of said arcs.

11. A device for measuring elements in a spherical triangle embodying: a frame; oppositely disposed arc supporting members mounted in said frame; arcs rotatably mounted in said arc supporting members, respectively; a great circle ring member comprising two concentric rings rotatable with respect to each other; a set of diametrically disposed pivots mounted on each of said concentric rings, one of said sets of pivots being supported by one of said arcs, the other set being supported by the other of said arcs; and one of said arc supporting members being rotatable for swinging the arc associated therewith and the great circle ring into transverse planes.

12. A device for measuring elements in a spherical triangle embodying: a frame; oppositely disposed arc supporting members mounted in said frame; arc rotatably mounted in said arc supporting members, respectively; a great circle ring member comprising two concentric rings rotatable with respect to each other; a set of oppositely disposed pivots mounted on each of said concentric rings, one of said sets of pivots being supported by one of said arcs, the other set being supported in the other of said arcs; indicating means for registering the relative rotative movement between said concentric rings, one of said arc supporting members being rotatable for swinging the arc associated therewith and the great circle ring into transverse planes; and bearing arcs for indicating the swinging movement of said great circle ring.

13. A device for determining great circle distances between points on a sphere, embodying: a great circle ring member comprising a complete circle; means for positioning and supporting said great circle ring member so that it corresponds to the great circle containing the points in question; means for locating the positions of said points on said ring member; means for moving one point location to the other point location on said ring; and means associated with said ring member for registering the distance traversed during such movement.

14. A device for determining great circle distances between points on a sphere, embodying: a great circle ring member comprising two concentric rings rotatable in a common plane with respect to each other; means for positioning and supporting said great circle ring member so that it corresponds to the great circle containing the points in question; means for establishing the position of one point on one of said rings; and means for establishing the position of the other point on the other of said rings.

15. A device for measuring elements in spherical triangles embodying: a frame; oppositely disposed arc-supporting members mounted in said frame; arcs rotatably mounted in said arc-supporting members, respectively; a great circle ring member; pivots mounted on said ring member and supported by said arcs, respectively, said pivots being adapted for relative movement about said ring member; means for moving said pivots relative to each other; and indicating means operable by said moving means to register the relative movement between said pivots.

16. A device for measuring elements in spherical triangles embodying: a frame; oppositely disposed arc-supporting members mounted in said frame; arcs rotatably mounted in said arc-supporting members, respectively; a great circle ring member; pivots mounted on said ring member and supported by said arcs, respectively, said pivots being adapted for relative movement about said ring member; one of said arc-supporting members being adapted for rotation about a vertical axis; means for rotating said rotatable arc-supporting member about a vertical axis; and indicating means operable by said rotating means for registering the annular movement of said last mentioned arc-supporting member relative to said vertical axis.

17. A device for measuring elements in spherical triangles embodying: a frame; oppositely disposed arc-supporting members mounted in said frame; arcs rotatably mounted in said arc-supporting members, respectively; a great circle ring member; pivots mounted on said ring member and supported by said arcs, respectively, said pivots being adapted for relative movement upon said ring member; means for moving said pivot points relative to each other; means for rotating one of said arc-supporting members; and indicating means operable by said last mentioned means for registering the circumferential movement of said rotatable arc-supporting member.

18. A device for measuring elements in spherical triangles embodying: a frame; oppositely disposed arc-supporting members mounted in said frame; arcs rotatably mounted in said arc supporting members, respectively; a great circle ring member; pivots mounted on said ring member and supported by said arcs, respectively, said pivots being adapted for relative movement about said ring members; means for rotating one of said arc supporting members; means for circumferentially moving said arcs in said arc-supporting members; and indicating means operable by said last mentioned means for registering a movement of said arcs in said supporting member.

19. A device for measuring elements in a spherical triangle embodying: a frame; oppositely disposed arc-supporting members mounted in said frame; arcs rotatably mounted in said arc-supporting members, respectively; a great circle ring member comprising two coplanar concentric rings rotatable with respect to each other in their common plane; a set of diametrically disposed pivots mounted on each of said concentric rings, one of said sets of pivots being supported by one of said arcs, the other set being supported in the other of said arcs; means for rotating one of said arc-supporting members to move one of said sets of pivots relative to the other of said sets of pivots; and indicating means operable by said moving means for registering the relative rotatable movement between said sets of pivots.

In testimony whereof, I have hereunto set my hand at Los Angeles, California, this 2nd day of November, 1929.

JOSEPH F. BURNS.